(No Model.)

A. BROWN.
VOLTAIC BATTERY PLATE.

No. 264,618. Patented Sept. 19, 1882.

Witnesses:
Wm A. Skinkle
K. Lockwood

Inventor:
Alexander Brown,
by his Attorneys
Pope Edgecomb & Butler

UNITED STATES PATENT OFFICE.

ALEXANDER BROWN, OF BROOKLYN, NEW YORK.

VOLTAIC-BATTERY PLATE.

SPECIFICATION forming part of Letters Patent No. 264,618, dated September 19, 1882.

Application filed June 14, 1882. (No model.)

*To all whom it may concern:*

Be it known that I, ALEXANDER BROWN, a citizen of the United States, and a resident of Brooklyn, in the county of Kings and State of New York, have invented certain new and useful Improvements in Voltaic-Battery Plates, of which the following is a specification.

The object of my invention is to provide a zinc plate or element for voltaic batteries, having a conducting-arm so constructed as to retain sufficient thickness and strength, notwithstand the corrosive action of the solutions, to support the conducting-electrode so long as the plate itself remains serviceable.

It has heretofore been the practice to construct the zinc-plate, which is used in connection with a carbon or platinum plate of a cylindrical form, and to provide the same with a conducting arm or terminal of the same material, extending vertically along and forming a part of the cylindrical body. The portion of the arm projecting above the body of the zinc is exposed to the action of the acid solutions of the battery upon all four of its sides. Hence it is rapidly decomposed, and soon becomes too much weakened to sustain its own weight, while the plate itself is but partially consumed. Moreover, the angles formed at the junction of the arm with the plate afford places wherein small quantities of the acid solutions collect when the plates are removed from the battery, and the chemical action is thus continued unnecessarily while the battery is inoperative.

My invention consists in increasing the normal thickness or mass of the plate about the arm at the point where it is joined thereto, thus filling the internal vertical angles; and it further consists in enlarging the arm itself at the point where it leaves the plate.

Figure 1:
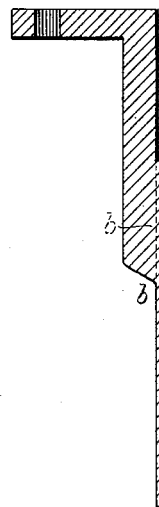
Figure 2:
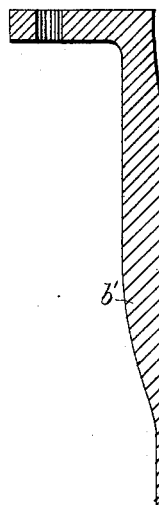

In the accompanying drawings, Figure 1 represents an elevation, partly in section, of the form of battery-plate heretofore in general use. Fig. 2 is a similar view of a plate embodying my improvements, and Fig. 3 is a plan view of the same.

Referring to Fig. 1, A represents a zinc plate or element, such as is commonly employed in nitric and chromic acid batteries, consisting of a hollow cylindrical body of metal of uniform thickness. An arm, B, constituting the terminal or electrode of the plate, consisting of a rectangular mass of zinc, projects from one side of the cylinder and extends above it a sufficient distance to rise above the surface of the exciting-solution and pass over the upper edge of the containing-jar for the convenient attachment and support of the electrode of the next jar of the series. The internal angles, $a$ and $b\ b$, formed by the junction of the plate and the arm, afford places in which some portion of the acid solutions of the battery collect when the plate is removed therefrom; and, moreover, the arm itself at the point where it joins the plate, being of a thickness not greater, but, on the contrary, usually less, than that of the plate itself, and being, moreover, exposed to the action of the exciting-solution upon its four sides, is much more rapidly decomposed than the remainder of the plate, and soon becomes too slender to support its own weight, while the plate itself is but partially consumed. In this manner plates which are otherwise in good condition are rendered useless by the breakage of the conducting arm or electrode.

Figure 3:
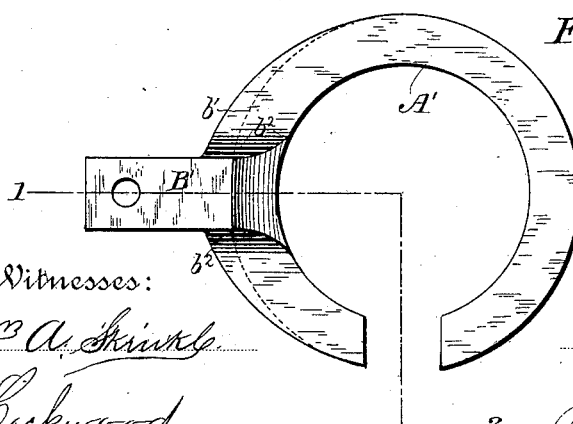

In Figs. 2 and 3, A' represents a battery-plate similar in its general form and manner of use to that shown in Fig. 1, but which is so constructed as to avoid the objections hereinbefore set forth. The arm B' projects from one side of the cylindrical plate; but the thickness of the metal is increased on each side of it, as shown at $b'$, Fig. 3, thus completely filling the vertical angles shown at $b$ in Fig. 1. The angle formed at the upper edge of the plate, at the point where the arm is joined thereto, is likewise filled with the metal, as shown at $a'$ and at $b^2\ b^2$, thus enlarging and strengthening the base of the arm itself, and at the same time leaving no place where the corrosive solution can collect when the plate is removed from the battery.

In practice it will be found desirable to cast the entire plate and arm, together with the filling for the angles, in a single piece.

I have described my improvements in connection with a cylindrical plate; but it is evident that they are applicable to any of the ordinary forms of battery-plates provided with or supported by a vertical arm.

I claim as my invention—

1. The combination, substantially as hereinbefore set forth, with a battery-plate of a thickness gradually increasing upon one side in both directions toward a vertical line, of a terminal arm or electrode joined to said plate above its thickest portion and enlarged at its point of junction therewith.

2. The combination, substantially as hereinbefore set forth, of a cylindrical battery-plate increasing in thickness upon one side in both directions toward a vertical line, and a terminal arm or electrode joined to said plate above its thickest portion.

In testimony whereof I have hereunto subscribed my name this 10th day of June, A. D. 1882.

ALEXANDER BROWN.

Witnesses:
MILLER C. EARL,
D. W. EDGECOMB.